United States Patent Office.

GEORGE E. VAN DERBURGH, OF NEW YORK, N. Y.

Letters Patent No. 62,166, dated February 19, 1867; antedated February 14, 1867.

---

IMPROVED ARTIFICIAL STONE FOR BUILDING.

---

The Schedule referred to in these Letters Patent and making part of the same.

---

TO ALL WHOM IT MAY CONCERN:

Be it known that I, GEORGE E. VAN DERBURGH, of the city, county, and State of New York, have invented new and improved Artificial Blocks or Stones suitable for Building and Ornamental Purposes; and I do hereby declare the following to be a full, clear, and exact description thereof.

The nature of my invention consists in the production, substantially as hereinafter described, of artificial blocks or stones composed mainly of silicate of lime in combination with silex, with or without carbonate of lime and other ingredients.

In the artificial stones and building materials composed of lime and sand, heretofore used or described, such as the "Foster blocks," the "American building blocks," &c., the lime forming the basis of such blocks is suffered to become a carbonate from exposure to the atmosphere, this carbonate of lime being relied upon as the bond or cementing ingredient in the composition, imparting to the block its required firmness, hardness, and durability. I have, by experimental tests, found silicate of lime far superior to a carbonate of lime in fulfilling the requirements needed in stone or other good building material, and in supplying strength, hardness, closeness of texture, and durability thereto; and by the development and use of this material as follows, I obtain in my present invention a cheap artificial building block or stone, which I find superior to any other in all these essential requisites.

I mix dry caustic or hydrated quick-lime with moist sand in air-tight cylinder, or by any other suitable means, in about the proportion of one part of lime to eight or ten of sand, or other silicious material, and then reducing the mass to a thick paste with water, carefully protect the same from the carbonic acid of the atmosphere for at least thirty days by keeping the mass constantly moistened until the lime, partially decomposing the particles of silex, is converted into a silicate of lime, coating each of said particles. After moulding the mass in which silicate of lime has thus been produced, I then subject the blocks or other devices formed therefrom to the action of the atmosphere, which will convert any excess of quick-lime yet remaining in the mass into a carbonate, which, in combination with the silicate already formed as described, will produce in drying an exceedingly hard and durable material. The proportion of silicate in the finished block will increase in proportion to the length of time in which the exclusion of carbonic acid under moisture is maintained, and the process of its formation may be hastened by the application of heat with the moisture, as, for instance, by the use of steam in the process. The ripening of the silicate of lime block may also be hastened by adding cement to the composition, and I contemplate adding other ingredients thereto, such as gypsum, chalk, &c., for varying textures, and oxide of iron or other coloring matters to impart thereto any desired tints.

I do not claim broadly the use of a composition of silicate of lime and sand obtained simply by the exclusion of the carbonic acid of the atmosphere from a composition as hereinbefore described; but I claim as a new article of manufacture, and desire to secure by Letters Patent—

A finished block or stone of any desired form for building or ornamental purposes, produced substantially in the manner herein set forth.

GEORGE E. VAN DERBURGH.

Witnesses:
MOT. SNOOK,
GEO. A. MAYHEW.